United States Patent
Danilov et al.

(10) Patent No.: US 10,866,766 B2
(45) Date of Patent: Dec. 15, 2020

(54) AFFINITY SENSITIVE DATA CONVOLUTION FOR DATA STORAGE SYSTEMS

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/261,551

(22) Filed: Jan. 29, 2019

(65) Prior Publication Data

US 2020/0241804 A1    Jul. 30, 2020

(51) Int. Cl.
  *G06F 16/185* (2019.01)
  *G06F 3/06* (2006.01)
  *G06F 16/29* (2019.01)
  *G06F 16/2457* (2019.01)

(52) U.S. Cl.
  CPC ............ *G06F 3/0661* (2013.01); *G06F 3/067* (2013.01); *G06F 3/0608* (2013.01); *G06F 16/185* (2019.01); *G06F 16/24578* (2019.01); *G06F 16/29* (2019.01)

(58) Field of Classification Search
  CPC .. H04L 41/044; H04L 61/2514; H04W 84/04; G06F 3/067; G06F 16/24578; G06F 16/185; G06F 16/29; G06F 16/24556
  See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,502,243 B1 | 12/2002 | Thomas |
| 7,389,393 B1 | 6/2008 | Karr et al. |

(Continued)

OTHER PUBLICATIONS

Office Action dated Nov. 16, 2018 for U.S. Appl. No. 15/662,273, 19 pages.

(Continued)

*Primary Examiner* — Ernest Unelus
(74) *Attorney, Agent, or Firm* — Amin, Turocy & Watson, LLP

(57) ABSTRACT

Affinity sensitive data convolution in a geographically diverse data storage system is disclosed. In response to determining an affinity of a zone to another zone, convolution of a first data chunk can be altered. In an aspect, the convolution can be altered by selecting a second chunk of a target zone based on the determined affinity, which can result in a change in distribution of represented zones in convolved chunks in a geographically diverse data storage system. In another aspect, the first data chunk can be directed to a target zone where it can be convolved with a second chunk, which can also result in a change in distribution of represented zones in convolved chunks in a geographically diverse data storage system. In some embodiments, constraints on convolution of data can also be instituted. Increasing distribution of represented zones can correspondingly distribute loading of computing resources to access data of convolved chunks.

20 Claims, 10 Drawing Sheets

(56) References Cited

U.S. PATENT DOCUMENTS

| | | |
|---|---|---|
| 7,680,875 B1 | 3/2010 | Shopiro et al. |
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,063,838 B1 | 6/2015 | Boyle et al. |
| 9,208,009 B2 | 12/2015 | Resch et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,747,057 B1 | 8/2017 | Ramani et al. |
| 9,864,527 B1 | 1/2018 | Srivastav et al. |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0286516 A1 | 10/2017 | Horowitz et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181612 A1 | 6/2018 | Danilov et al. |
| 2018/0246668 A1 | 8/2018 | Sakashita et al. |

(56) References Cited

U.S. PATENT DOCUMENTS

| | | | |
|---|---|---|---|
| 2018/0267856 A1 | 9/2018 | Hayasaka et al. | |
| 2018/0267985 A1 | 9/2018 | Badey et al. | |
| 2018/0306600 A1 | 10/2018 | Nicolaas et al. | |
| 2018/0307560 A1 | 10/2018 | Vishnumolakala et al. | |
| 2018/0341662 A1* | 11/2018 | He | H04L 61/256 |
| 2019/0028179 A1 | 1/2019 | Kalhan | |
| 2019/0034084 A1 | 1/2019 | Nagarajan et al. | |
| 2019/0043201 A1 | 2/2019 | Strong et al. | |
| 2019/0043351 A1 | 2/2019 | Yang et al. | |
| 2019/0050301 A1 | 2/2019 | Juniwal et al. | |
| 2019/0065092 A1 | 2/2019 | Shah et al. | |
| 2019/0065310 A1 | 2/2019 | Rozas | |
| 2019/0114223 A1 | 4/2019 | Pydipaty et al. | |
| 2019/0205437 A1 | 7/2019 | Larson et al. | |
| 2019/0215017 A1 | 7/2019 | Danilov et al. | |
| 2019/0220207 A1 | 7/2019 | Lingarajappa | |
| 2019/0384500 A1 | 12/2019 | Danilov et al. | |
| 2019/0386683 A1 | 12/2019 | Danilov et al. | |
| 2020/0026810 A1 | 1/2020 | Subramaniam et al. | |
| 2020/0050510 A1 | 2/2020 | Chien et al. | |
| 2020/0104377 A1 | 4/2020 | Earnesty, Jr. et al. | |
| 2020/0117556 A1 | 4/2020 | Zou et al. | |

OTHER PUBLICATIONS

Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Non-Final Office Action received for U.S. Appl. No. 15/651,504 dated Mar. 21, 2019, 10 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "F4: Facebook's Warm Blob Storage System", USENIX. Osdi, Oct. 2014, pp. 383-398.
Final Office Action dated Feb. 12, 2020 for U.S. Appl. No. 16/024,314, 29 pages.
Office Action dated Jan. 9, 2020 for U.S. Appl. No. 16/010,255, 31 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer_science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Office Action received for U.S. Appl. No. 16/010,246 dated Jul. 27, 2020 36 pages.

(56) References Cited

OTHER PUBLICATIONS

Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (Fast '19), [https://www.usenix.org/conference/fast19/presentation/zhou], Feb. 2019, Boston, MA, USA. 14 pages.
Office Action for U.S. Appl. No. 16/010,255 dated Oct. 29, 2020, 65 pages.
Office Action for U.S. Appl. No. 16/240,272 dated Oct. 27, 2020, 42 pages.
Office Action for U.S. Appl. No. 16/399,902 dated Oct. 28, 2020, 83 pages.

* cited by examiner

AFFINITY SENSITIVE DATA CONVOLUTION FOR DATA STORAGE SYSTEMS

TECHNICAL FIELD

The disclosed subject matter relates to data convolution, more particularly, to adapting convolution of data blocks in a geographically diverse data storage system based on a determined affinity of a node of the geographically diverse data storage system.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
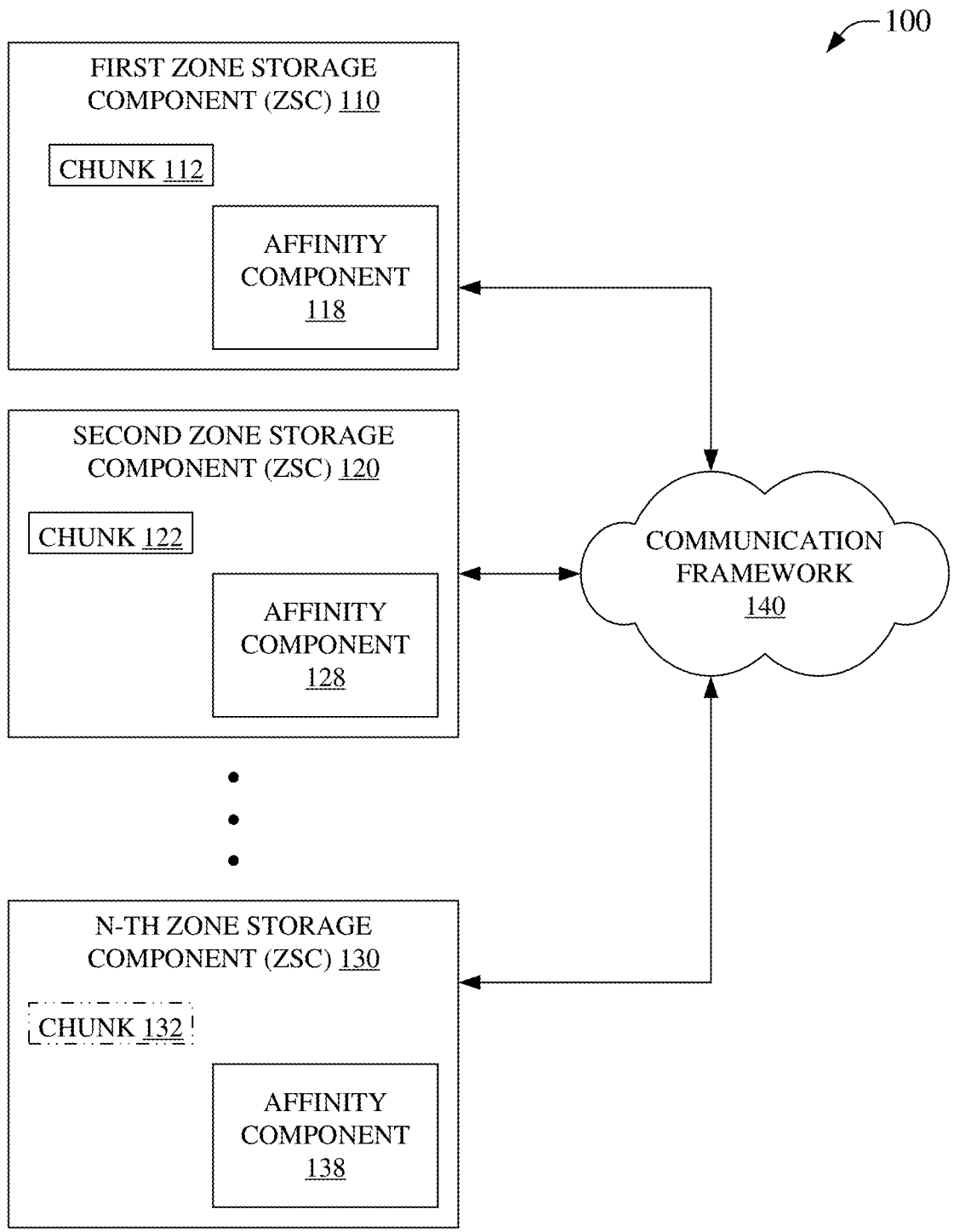
FIG. 1 is an illustration of an example system that can facilitate affinity sensitive data convolution in a geographically diverse storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as data chunks, chunks, etc., for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk is determined to be 'full enough,' it can be sealed so that the data therein is generally not available for further modification, e.g., the chunk can designated as immutable. These chunks can be then stored in a geographically diverse manner to allow for recovery of the data where a first copy of the data is destroyed, e.g., disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved in Denver, for example via an 'XOR' operation, into a different chunk, e.g., a convolved chunk, to allow recovery of the Seattle or San Jose data from the convolved chunk, but where the convolved chunk typically consumes less storage space in Denver than the sum of the storage space for both the Seattle and San Jose chunks individually in Denver. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably unless explicitly or implicitly contraindicated. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used at a geographically distinct location.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, convolution can also be based on copies of the first and second chunks created at the third zone. In an aspect, a convolved chunk stored at a geographically diverse storage device can comprise data from some or all storage devices of a geographically diverse storage system. As an example, where there are five storage devices, a first storage device can convolve chunks from the other four storage devices to create a 'backup' of the data from the other four storage devices. In this example, the first storage device can create a backup chunk from chunks received from the other four storage devices. In an embodiment, this can result in generating copies of the four received chunks at the first storage device and then convolving the four chunks to generate a fifth chunk that is a backup of the other four chunks. Moreover, one or more other copies of the four chunks can be created at the first storage device for further redundancy. In another example, the first storage device can convolve chunks from three of the other four storage devices.

In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk. As such, there can be redundancy in a zone and other redundancy between zones.

In an aspect, as data in chunks becomes stale, old, redundant, etc., it can be desirable to delete these chunks to free storage space for other uses. In an aspect, a convolved chunk can be de-convolved, partially or completely, to yield other chunks, e.g., the other chunks can represent the same data as the convolved chunk but can typically consume more storage space because these other chunks are less highly convolved. As an example, the chunk (AB(CD)), which can be chunk A convolved with Chunk B convolved with a chunks that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a chunk is to be deleted in a remote zone, the deconvolution can comprise transfer of other chunks to facilitate the deconvolution. As an example, where the chunk (AB(CD)) is at a first zone, and chunk D is to be deleted, data for chunks A, B, and C, can be replicated in the first zone from other zones to allow deconvolution, e.g., (AB(CD)) XOR (ABC), where data for chunks A, B, and C, is replicated into the first zone can result in chunks (ABC) and D, such that chunk D can be deleted and leave just chunk (ABC) at the first zone. As such, it can be desirable to reduce the resource consumption in replicating chunks between zones to facilitate the deletion of a chunk from a convolved chunk. As an example, it can consume less bandwidth to replicate chunk (ABC) from a second zone to the example first zone as compared to replicating each of chunk A, chunk B, and chunk C from the second zone to the first zone. This can be accommodated, for example, by first, in the second zone, generating a compressed chunk (ABC), such as from chunks A, B, and C, from chunk AB and chunk C, from chunk AC and chunk B, etc., prior to replicating generated chunk ABC into the first zone.

Similarly, recovery of data from a convolved chunk can be computer resource intensive, e.g., processor, memory, network, storage, etc., intensive. As an example, loss of access to data of a Seattle zone can result in deconvolution of convolved chunks in other zones as part of recovering the Seattle zone. The example deconvolution can comprise moving chunks between the other zones to enable the deconvolution at the other zones, use of processor time in the other zone, use of memory in the other zones, use of storage space in the other zones, etc. As such, it can be desirable to spread the burden of a recovery process over many zones, e.g., it can be desirable that many processors, memories, storage devices, networks, etc., are active in the recovery in comparison to burdening fewer zones more heavily to achieve the same recovery. As an example, where a failed Seattle zone data is redundantly stored in convolved chunks in three other zones, these three zones and their associated computer resources can perform the data recovery in a first time and with a first cost, wherein cost can be monetary cost, resource usage, etc. Where, in this example, the Seattle zone was backed up across eight zones, for example, comprising the previous three zones, the disaster recovery can occur in a second time at a second cost. Whereas the count of processors, memory, storage area, and available network resources is larger in the eight zone permutation, the second time and second cost can be expected to be lower than the first time and the first cost.

In some geographically diverse storage systems, zones can be located sufficiently far apart so as to result in peak chunk production occurring at substantially different times, for example, if we assume that most chunks are created during normal business hours, then a Moscow Russia zone can be expected to create chunks when a Seattle USA zone is producing relatively few chunks due to the 11-hour time zone difference between Moscow and Seattle. This can complicate chunk convolution in several ways. Given a third zone, for example, in Houston USA, which can have a 2-hour time difference from the Seattle zone, convolution of data from Seattle and Houston can primarily occur into the Moscow zone because chunks from Seattle and Houston are being generated at similar times and while few chunks are being generated in Moscow again due to the time difference. Similarly, given a fourth zone, for example, a Tokyo zone, chunks can primarily be convolved to the Seattle zone from the Moscow and Tokyo zones because Moscow and Tokyo are typically more likely to generate chunks at similar times, e.g., Moscow and Tokyo can be six time zones apart in contrast to Moscow-Seattle being 11 time zones apart and Tokyo-Seattle being 17 time zones apart. As such, where convolved chunks can be concentrated in certain zones, for example, as a result of differences in times when chunks are being generated, this can result in imbalanced loading of computer resources, e.g., processor resources, network resources, memory resources, storage resources, etc., both in creating the convolved chunks, which is typically less of a problem, and in recovering data from convolved chunks in response to difficulty in accessing non-convolved data at a zone, e.g., disaster recovery, etc. In general, real world deployment of a geographically diverse data storage system can result in an affinity between zones that, for example, can be a result of when chunks are created, etc., which can result in imbalances in convolved storage and recovery from convolved storage.

This affinity can be employed, in some embodiments, to control communication of a chunk to a selected target zone where they can be convolved with another chunk. As an example, many chunks of a first zone and a second zone can be represented in many convolved chunks in a target zone resulting in a correspondingly high affinity to the target zone in comparison to affinities with other zones and, accordingly, the first zone can steer other chunks to the other zones to better balance the affinities. In other embodiments, a target zone can receive a first chunk from a first zone and then selectively convolve the first chunk with a second chunk received from a second zone in a manner that balances affinities. As an example, many chunks of a first zone and a second zone can be represented in many convolved chunks in a target zone resulting in a correspondingly high affinity to the target zone in comparison to affinities with other zones and, accordingly, the target zone can be instructed to convolve chunks from the first zone with chunks from zones other than chunks from the second zone to better balance the affinities. In an embodiment, the example target zone can delay convolving chunks from the first zone, even where chunks form the second zone are available, until chunks from other zones are available so as to better balance the affinities, which can correspond to distribution of convolved chunks that can reduce computer resource consumption, e.g., in response to a data loss event, etc., as disclosed herein.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '$\oplus$', etc., where the data in the Seattle and Dallas local chunks can be convolved by XOR processes to form the Boston chunk, e.g., $C=A1 \oplus B1$, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter, in some embodiments, can be applied to data of a single disk, memory, drive, data storage device, etc., without departing from the scope of the disclosure, e.g., the zones in some embodiments can represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for deconvolution of the XOR data chunk to regenerate the input data chunk data. Continuing a previous example, the Fargo chunk, D, can be de-convolved into C1 and E1 based on either C1 or Dl; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, deconvolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to deconvolve C. As an example, where the Seattle chunk, A, is corrupted, the data can be recovered from C by deconvolving C with a replica of the Dallas chunk B. As such, B can be replicated by copying B from Dallas to Boston as B1, then deconvolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to deconvolve C with after A has been deleted. As such, it can be desirable to deconvolve C into A1 and B1 prior to deleting A and A1, such that B1 can be convolved with another chunk, for example Miami chunk, E. As such, recovery of B1 can be based on E1 and the XOR of B1E1. Also of note, to deconvolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate affinity sensitive data convolution in a geographically diverse storage system, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100, e.g., via communication framework 140, etc. A zone can correspond to a geographic location or region. As such, different zones can be associated with different geographic locations or regions. A ZSC can comprise one or more data stores in one or more locations. In an aspect, a ZSC can store at least part of a data chunk on at least part of one data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc.

In an aspect, data chunks, e.g., chunk 112, 122, etc., can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing intra-zone data redundancy that can protect the data of the first chunk, for example, where a storage device storing the first chunk or a replicate thereof becomes compromised, the other replicates (or the first chunk itself) can remain uncompromised within the zone. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available within a zone.

In an aspect, replication of a chunk(s) can enable deconvolution of a convolved chunk(s) at another zone(s). As an example, where chunk 112 and chunk 122 are convolved into chunk 132, then chunk 112 can be recovered via deconvolving chunk 132 with chunk 122 or a copy of chunk 122, chunk 122 can be recovered via deconvolving chunk 132 with chunk 112 or a copy of chunk 112, etc. In an aspect, chunk 112, chunk 122, etc., can be copied into N-th ZSC 130 to facilitate deconvolution of chunk 132, for example, in a data recovery event, in a data deletion event, etc. Copying can consume computer resources, e.g., can occur over a network, can entail a processor to transmit a chunk copy via the network interface, a memory at N-th ZSC 130 to store the copy, a processor of N-th ZSC 130 to deconvolve chunk 132 with the copy, storage space of N-th ZSC 130 to store the deconvolved chunks, network resources to send the recovered copy as part of the rebuilding process, etc. As noted herein, it can be desirable to spread resources consumption across available zones rather than concentrating resource demand in fewer than the available zones, which can occur if zone pairs become less evenly utilized. As an example, is can be desirable to spread a recover of a Seattle zone across a Houston, Moscow and Tokyo zone rather than basing recovery off only the Moscow zone. Moreover, it is noted that affinity balancing can be distinct from storage balancing, etc. An affinity of a zone can be determined by an affinity component, e.g., affinity components 118-138, etc. An affinity can relate to where convolved chunks are stored, e.g., how often, with what frequency, how many, etc., a chunk from a first zone is convolved with another chunk at another zone of a geographically diverse data storage system. As an example, frequently convolving chunks from a source zone at a target zone can be reflected in the target zone having a high affinity score, value, ranking, etc., to the source zone. As another example, a target zone can have a high count of total convolved chunks from a source zone, again reflected in a high affinity for the target zone. Similarly, for example, affinity can be related to a high count of relevant convolved chunks in a target zone, e.g., as compared to total convolved chunks, a count of relevant chunks can be related to convolved chunks that are not stale, out of date, targeted for deletion/garbage collection, etc. In an example geographically diverse data storage system, a first zone can comprise 1 petabyte (PB) of convolved chunks and a second zone can comprise 1 PB of convolved chunks, and can be viewed as having good storage balance, e.g., both zones store a similar amount of data. However, in this example, where the convolved chunks of the first zone are all for recovery of a third zone, and the convolved chunks of the second zone are all for recovery of a fourth zone, the zones can be viewed as being poorly affinity balanced because only the first zone will be burdened to recover the third zone and only the second zone will be burdened to recover the fourth zone. In contrast, where half of the convolved chunks of the first zone and half of the convolved chunks of the second zone are for recovery of the third zone, and similarly, the other halves are for recovery of the fourth zone, then the computer resources of the first and second zones can share the burden of recovering either the third or fourth zone and the system can be deemed to demonstrate good affinity balance.

Figure 2:
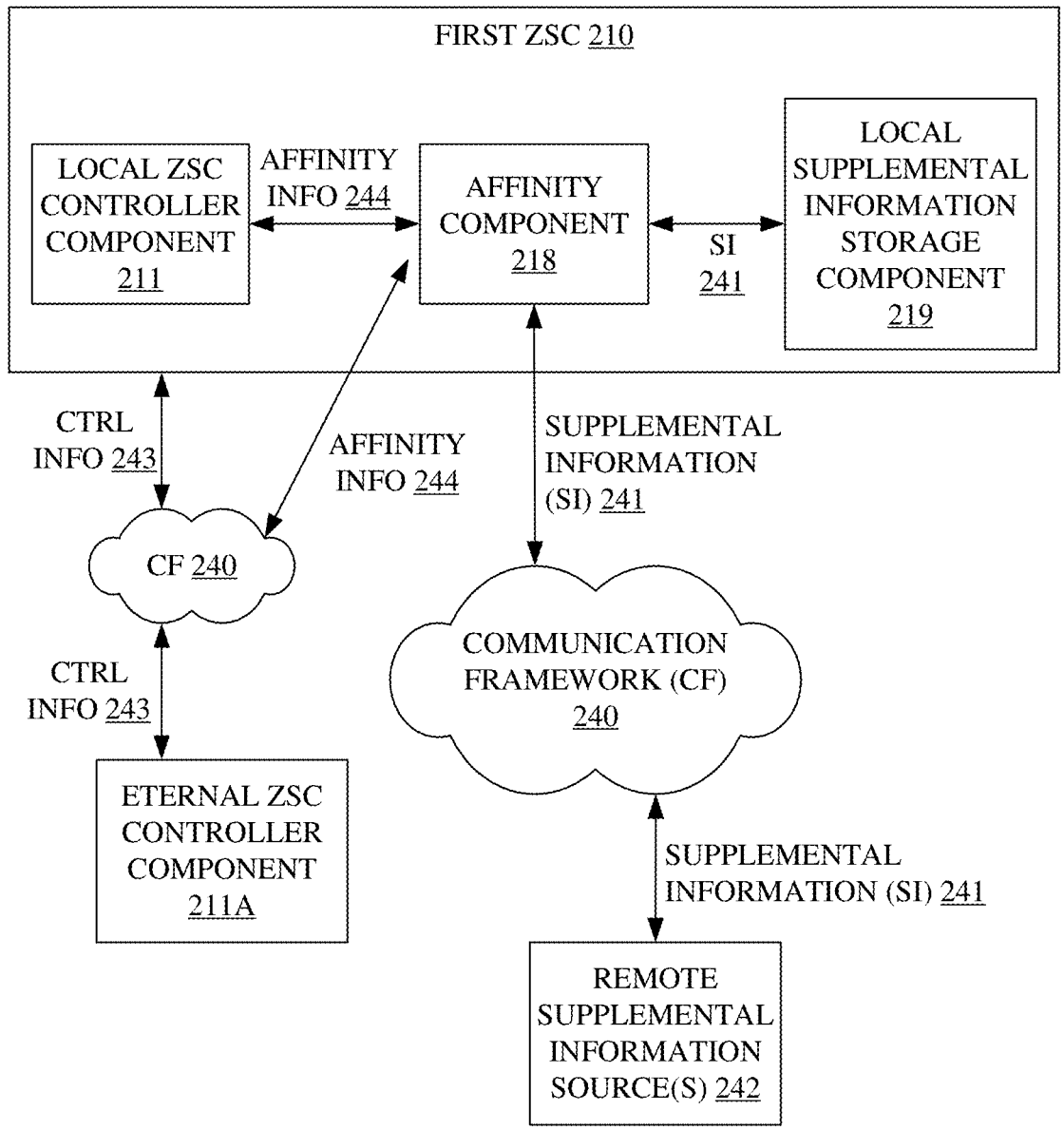
FIG. 2 is an illustration of an example system that can facilitate affinity sensitive data convolution in a geographically diverse storage system based on supplemental information, in accordance with aspects of the subject disclosure.

FIG. 2 is an illustration of a system 200, which can enable affinity sensitive data convolution in a geographically diverse storage system based on supplemental information, in accordance with aspects of the subject disclosure. System 200 can comprise first ZSC 210. First ZSC 210 can comprise affinity component 218 that can determine an affinity score, rank, level, tier, etc., hereinafter 'affinity', for a target zone, for example, based on historical convolution events between first ZSC 210 and the target zone. In an aspect, affinity component 218 can determine an affinity to one or more target zones, for example an affinity between first ZSC 210 and each of the other zones of a geographically diverse data storage system, between first ZSC 210 and some of the other zones of a geographically diverse data storage system, between first ZSC 210 and one other zone of a geographically diverse data storage system, etc.

In an aspect, an affinity can be based on supplemental information. Supplemental information can be stored locally, e.g., via local supplemental information storage component 219, etc., can be stored at or received from a remote source, e.g., remote supplemental information source(s) 242, etc. Supplemental information can comprise a current computer resource performance characteristic(s), a historical computer resource performance characteristic(s), a convolution history, a selectable constraint, etc. A selectable constraint can indicate a constraint on zone selection, e.g., selecting a zone as a target zone for convolving a chunk, etc., that can affect or relate to an affinity score. As an example, a selectable constraint can indicate that a convolved chunk must be kept inside a selectable geo-political boundary, such as constraining convolved chunk generation to zones located in the United States, etc. As another example, a selectable constraint can indicate a preference to create a convolved chunk at a lower monetary cost, lower resource cost, etc., which can alter an affinity score based on determined costs for convolving chunks in zones of the geographically diverse data storage system, e.g., a zone having older storage media can be associated with higher computer resource consumption to perform a convolve operation, which can result in an affinity reflecting these higher costs. As a further example, a selectable constraint can indicate some zones as preferred zones that can be associated with altering a corresponding affinity, e.g., where a target zone is connected with a high speed, high capacity, low latency, etc., network connection, it can be a preferred zone in comparison to a zone having a slower, higher latency, etc., network connection, which can be reflected in a determined affinity. In an embodiment, supplemental information can be received, accessed, etc., from a remote source via communication framework 240.

Affinity component 218 can generate affinity information 244. Affinity information 244 can indicate one or more affinity to one or more zones of the geographically diverse data storage system. Affinity information 244 can comprise, or enable, selection of a target zone for a convolution event, e.g., affinity information 244 can facilitate sending a chunk to a selected zone based on an affinity to the selected zone. In an embodiment, affinity information 244 can be communicated to a local ZSC controller component, e.g., local ZSC controller component 211, etc., to facilitate communication of a chunk from first ZSC 210 to a selected zone targeted to perform a convolution with the chunk based on an affinity of the selected zone. In some embodiments, control of first ZSC 210 can be via an external controller, e.g., external ZSC controller component 211a, etc., wherein affinity information 244 can be communicated to the external controller via communication framework 240 and control information, e.g., control information 243, etc., can then be communicated, again via communication framework 240 to effect directing communication of a chunk to a selected zone to be convolved in accord with an affinity of the selected zone. In an aspect, affinity information 244 can result in steering of a chunk ready to be convolved in a selected zone, delaying communication of the chunk based on a readiness of a selected zone to perform a convolution, etc.

Figure 3:
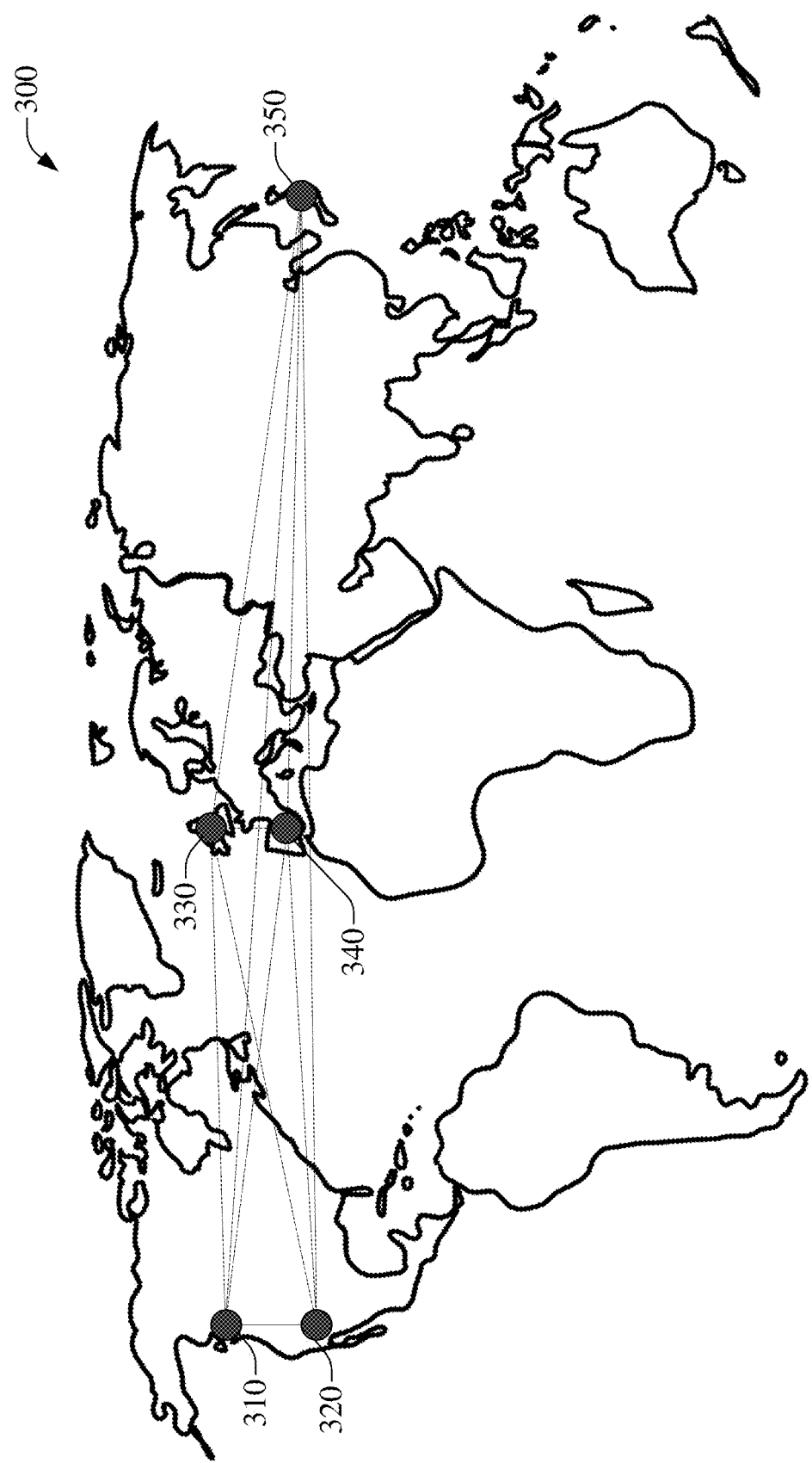
FIG. 3 is an illustration of an example system that can enable affinity sensitive data convolution in a geographically diverse storage system that can span multiple time zones, wherein the convolved data represents a group of more than two data chunks, in accordance with aspects of the subject disclosure.

FIG. 3 is an illustration of a system 300, which can facilitate affinity sensitive data convolution in a geographically diverse storage system that can span multiple time zones, wherein the convolved data represents a group of more than two data chunks, in accordance with aspects of the subject disclosure. System 300 illustrates example zones of a geographically diverse data storage system, e.g., zone 310, zone 320, zone 330, zone 340, and zone 350. As can be observed, the zones can be grouped in different time zones, e.g., zone 310 and zone 320 can be in a different time zone than zone 330 and zone 340, which can also be in a different time zone than zone 350. As is noted herein, chunks, in some environments for example, can be generated during windows of time that can relate to a particular time zone. As an example, chunks can be generated with greater frequency during normal business hours and less frequently in the middle of the night, however normal business hours in one time zone can be offset from normal business hours in another time zone such that where chunks are created in a first time zone there may be fewer corresponding chunks being created in the other time zone. In this example, the chunks generated by a first zone in the first time zone can show a higher affinity for being convolved with chunks from a second zone in the first time zone, resulting in a convolved chunk being generated at a third zone in a second time zone. This affinity can cause concentration of convolved chunks which, as is indicated herein, can be associated with higher computer resource use, for example, in disaster recovery operations. As an example, chunks from zone 310 and zone 320 can be generated during the same normal business hours because these zones can be in the same time zone. This can result in these chunks being convolved in zone 350, for example. In this example, it can be less likely to generate a chunk in zone 330 or zone 340 that can be convolved with a chunk from zone 310 or zone 320 because zones 330 and 340 can be in a different time zone than zones 310 and 320, e.g., normal business hours for zone 310 can be the middle of the night for zone 330, etc. In this example, the convolved chunks for zones 310 and 320 can reside primarily in zone 350 and, in case of disaster recovery, can introduce a heavy burden on zone 350 to recover either of zones 310 or 320. In some estimates, for a large data loss event and highly concentrated convolved chunks, it can take months or even years to recover a compromised zone.

By introducing an affinity component, e.g., affinity component 118-138, 218, etc., the predilection for concentrating convolved chunks can be detected and mitigated. As an example, where a high affinity for zone 350 is observed by zones 310 and 320, these zones can be instructed to send chunks to other zones, e.g., zone 330 340, etc., where the chunks can be stored until a another chunk becomes available and the two chunks can then be convolved at zone 330, 340, etc., which can start to distribute convolved chunks between other zones and can result in more even affinities across zones of a geographically diverse data storage system. As a further example, where each of zones 310-350, etc., determines an affinity with each other zone of a geographically diverse data storage system, chunks can be communicated in a manner that results in more balanced affinities, e.g., zone 310 can steer more chunks more evenly to zone 320, 330, 340, and 350, even where those chunks may wait before being convolved, rather than concentrating them in zone 350 where they may be convolved more rapidly. This can, for example, result in zone 310 determining that a first chunk has been convolved in zone 350 and then, rather than sending another chunk to zone 350, zone 310 can direct a second chunk to zone 320 based on a difference in affinity for zone 350 and affinity for zone 320, where the second chunk can wait until a third chunk, for example, generated at zone 330, etc., is sent to zone 320, after which the second chunk from zone 310 and the third chunk from zone 330 can be convolved at zone 320. In this example, the affinity for zone 350 and zone 320 can be the same where each one has convolved a chunk from zone 310. Continuing the example, zone 310 can next select to send a fifth chunk to zone 340, where the fifth chunk can wait to be convolved until a sixth chunk from another zone is available, which can result in the affinity of zones 320, 340, and 350 being the same from the perspective of zone 310. The example can continue to then send a chunk to zone 330 to be convolved, whereupon for zone 310, the affinity for all other zones can then be equal and any zone can be selected for a next convolve event.

In some embodiments, selectable constraints, as disclosed herein, can result in affinities for some zones being adjusted. As an example, a selectable constraint can limit convolved chunks to a geo-political region, such as the United States. In this example, the affinity to zone 320 can be adjusted so that all chunks from zone 310 are sent to zone 320 to be convolved, even where this practice results in concentration of convolved chunks in zone 320. It is noted that there can be other zones in the United States, and accordingly, an affinity to each of the zones in the United States can be employed to more evenly distribute convolved chunks across United States anchored zones. In another example, a selectable constraint can indicate that convolved chunks are not to be formed in zones experiencing military conflict, which can result in altering an affinity score to exclude zones in some war torn regions. As a further example, a selectable constraint can indicate that a chunk is to be convolved within a selectable time, e.g., 24 hours, etc., such that a chunk can be directed to a zone with that may be ranked less satisfactorily than another zone because the less satisfactorily ranked zone can enable the chunk to be convolved in the selected time, wherein this example illustrates that the disclosed subject matter can safeguard against orphaning chunks as a result of generating chunks at different velocities in different zones. As a still further example, a selectable constraint can indicate that a chunk is to be convolved according to a determined available data storage capacity, e.g., if a zone has more than a threshold level of free data storage space, less than a threshold level of free data storage space, etc., such that a chunk can be directed to a more/less full zone with that may be ranked less satisfactorily than another zone because the less satisfactorily ranked zone can satisfy the example free storage space constraint, wherein this example illustrates that the disclosed subject matter can safeguard against capacity exhaustion. Numerous other examples of the effect of a selectable constraint can be readily appreciated and all such examples are within the scope of the instant disclosure even where not expressly recited for the sake of clarity and brevity.

Figure 4:
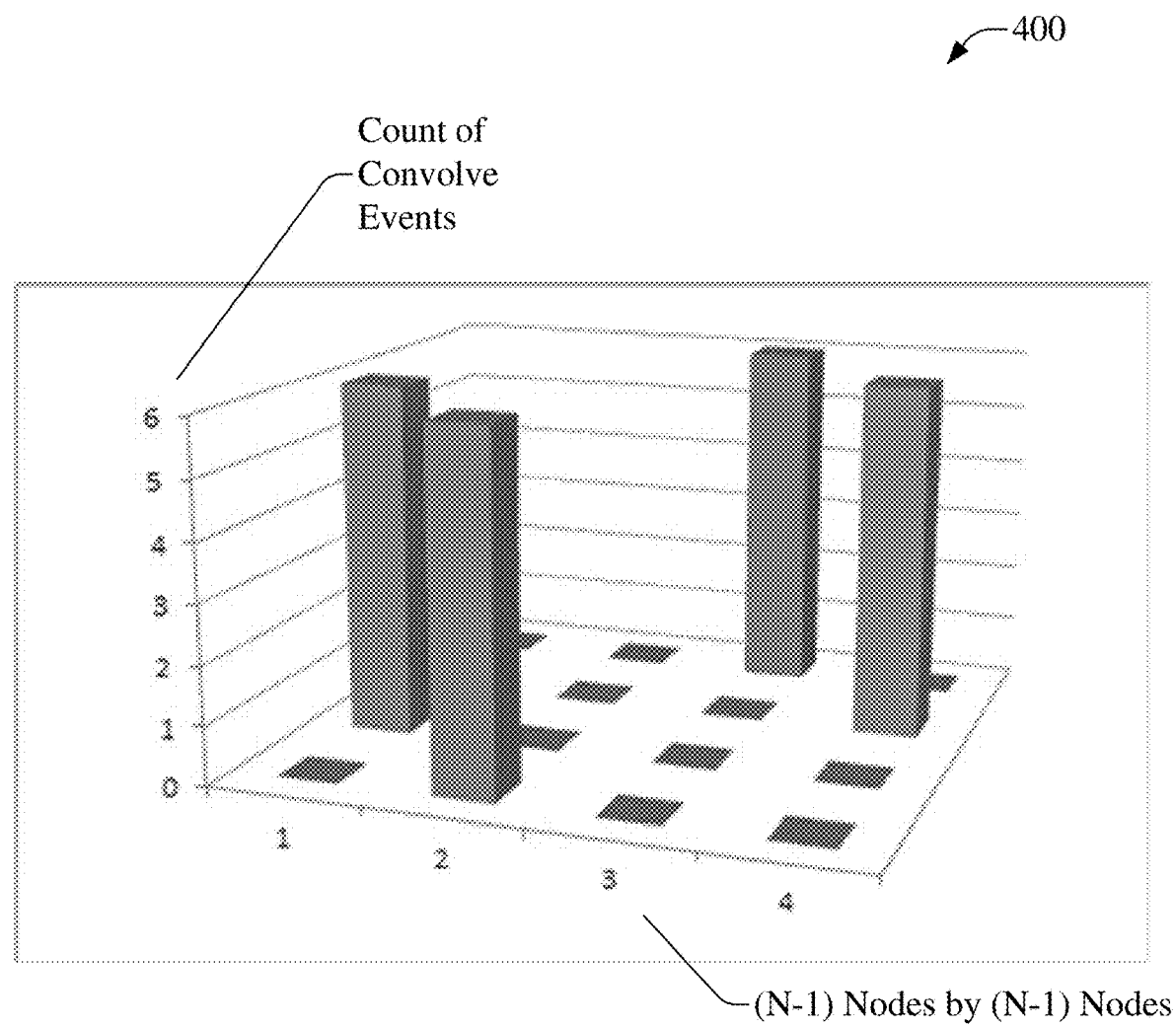
FIG. 4 illustrates an example affinity mapping that can result from poor affinity management for data convolution in a geographically diverse storage system, in accordance with aspects of the subject disclosure.

FIG. 4 is an illustration of example affinity mapping 400 that can result from poor affinity management for data convolution in a geographically diverse storage system, in accordance with aspects of the subject disclosure. Example affinity mapping 400 can comprise a three-dimensional plot reflecting data from an affinity matrix. A zone may create an affinity matrix to assess a quality of mutual dependence between different zones. An affinity matrix can be a square matrix that is (N−1)×(N−1), where N is a number of total zones including a source zone, e.g., for a geographically diverse data storage system having five zones, such as is depicted in FIG. 4, N=5 and the affinity matrix for any target zone is a 4×4 matrix, e.g., the matrix for the target zone reflects its affinity to other zones of the geographically diverse data storage system. In an embodiment of an affinity matrix, a value $X_{i,j}$ indicates a number of convolved chunks, e.g., XOR chunks, etc., that combine chunks from both the $i^{th}$ and $j^{th}$ other zones, e.g., a value $X_{310,320}$ indicates a count of convolved chunks that combine chunks from the zone 310 and zone 320. It is noted that $X_{i,i}=0$ and, further, that $X_{i,j}=X_{j,i}$. The disclosed subject matter can facilitate creating convolved chunks to flatten differences between all values $X_{i,j|i!=j}$.

Example affinity mapping 400 can reflect poor affinity balancing. This can, for example, occur where zone 350 of system 300 receives six data chunks from each remote zone, e.g., zones 310-340, and convolution at zone 350 occurs rapidly without consideration of zone affinities. In this example, zone 350 can generate the following convolved chunks, wherein a chunk is indicated by (pair source_zone_#).(chunk_#): 310.1⊕320.1, 310.2⊕320.2, 310.3⊕320.3, 310.4⊕320.4, 310.5⊕320.5, and 310.6⊕320.6 for chunks from zones 310 and 320 because chunks from zones 330 and 340 can be generated at a later time due to the time zone difference; and then when zones 330 and 340 become more active and zones 310 and 320 become less active due to the time zone difference, 330.1⊕340.1, 330.2⊕340.2, 330.3⊕340.3, 330.4⊕340.4, 330.5⊕340.5, and 330.6⊕340.6 for the zones 330 and 340. In example affinity mapping 400, these convolved chunks are clearly visible as the high spikes surrounded by many lower spikes and the affinity matrix can be understood to not be flat. This can be contrasted with FIG. 5, which can indicate use of affinities to keep an affinity matrix more flattened.

Figure 5:
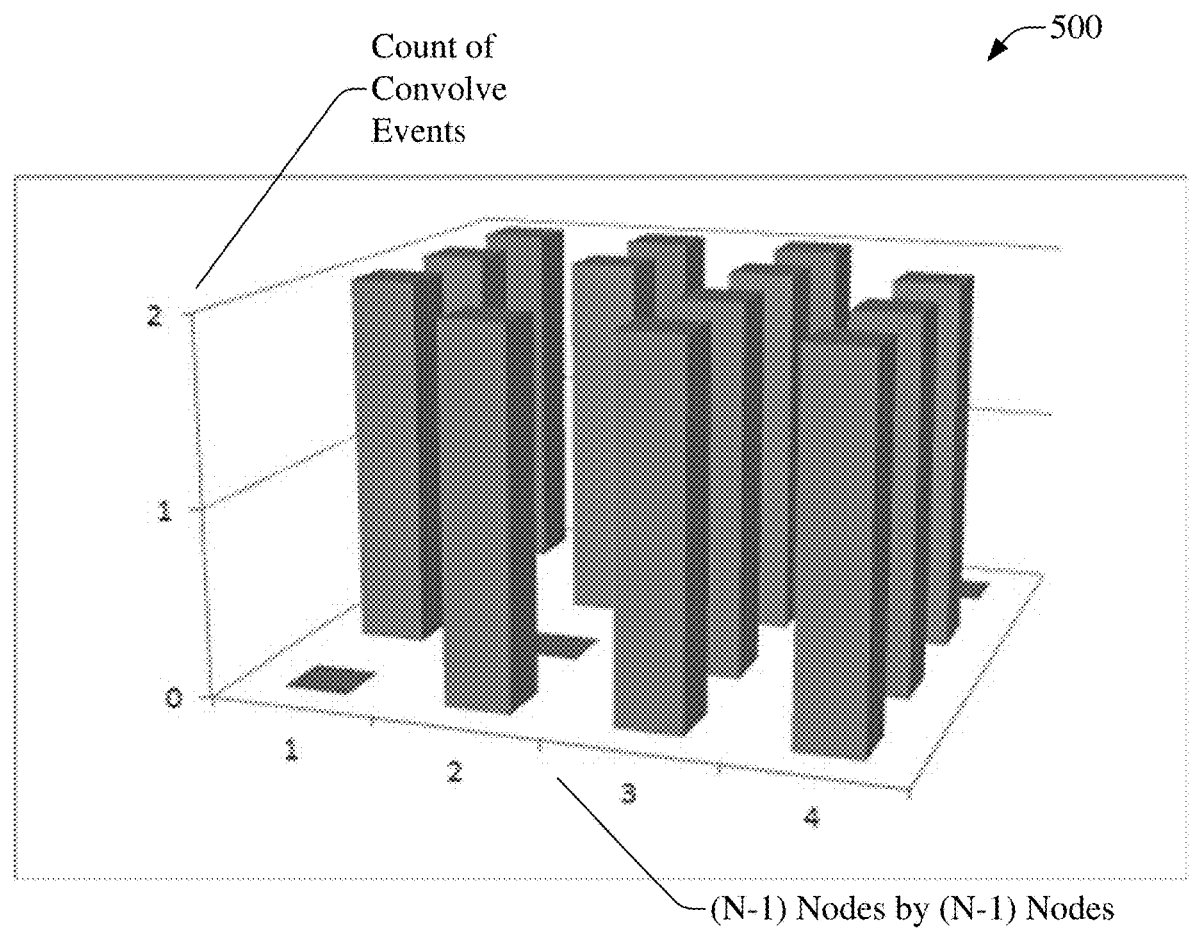
FIG. 5 is an illustration of an example affinity mapping that can result with improved affinity management for data convolution in a geographically diverse storage system, in accordance with aspects of the subject disclosure.

FIG. 5 is an illustration of example affinity mapping 500 that can result with improved affinity management for data convolution in a geographically diverse storage system, in accordance with aspects of the subject disclosure. Example affinity mapping 500, similar to example affinity mapping 400, illustrates a three-dimensional plot reflecting data from an affinity matrix. Example affinity mapping 500 can reflect improved affinity balancing. This can, for example, occur where zone 350 of system 300 receives six data chunks from each remote zone, e.g., zones 310-340, and convolution at zone 350 is performed in a delayed manner to mitigate the effect of zone affinities. In this example, zone 350 can generate the following convolved chunks: 310.1⊕320.1, 310.2⊕320.2, 310.3⊕330.1, 310.4⊕330.2, 310.5⊕340.1, 310.6⊕340.2, 320.3⊕330.3, 320.4⊕330.4, 320.5⊕340.3, 320.6⊕340.4, 330.5⊕340.5, and 330.6⊕340.6 for chunks from zones 310-340 because chunks from zones 310 and 320 can be held until chunks form zones 330 and 340 have been generated to mitigate affinity difference occurring because of the time zone difference. In example affinity mapping 500, the example convolved chunks not appear substantially more flat than occurred in example affinity mapping 400.

Figure 6:
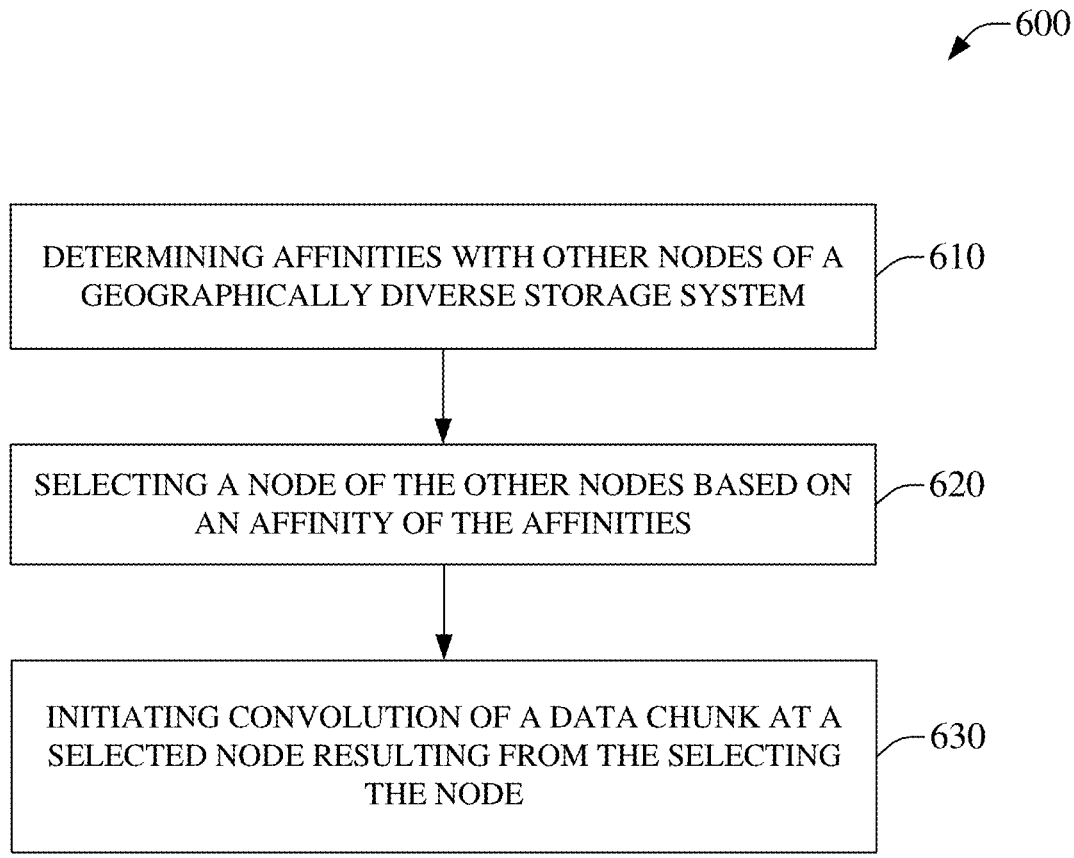
FIG. 6 is an illustration of an example method that can facilitate affinity sensitive data convolution in a geographically diverse storage system, in accordance with aspects of the subject disclosure.
Figure 7:
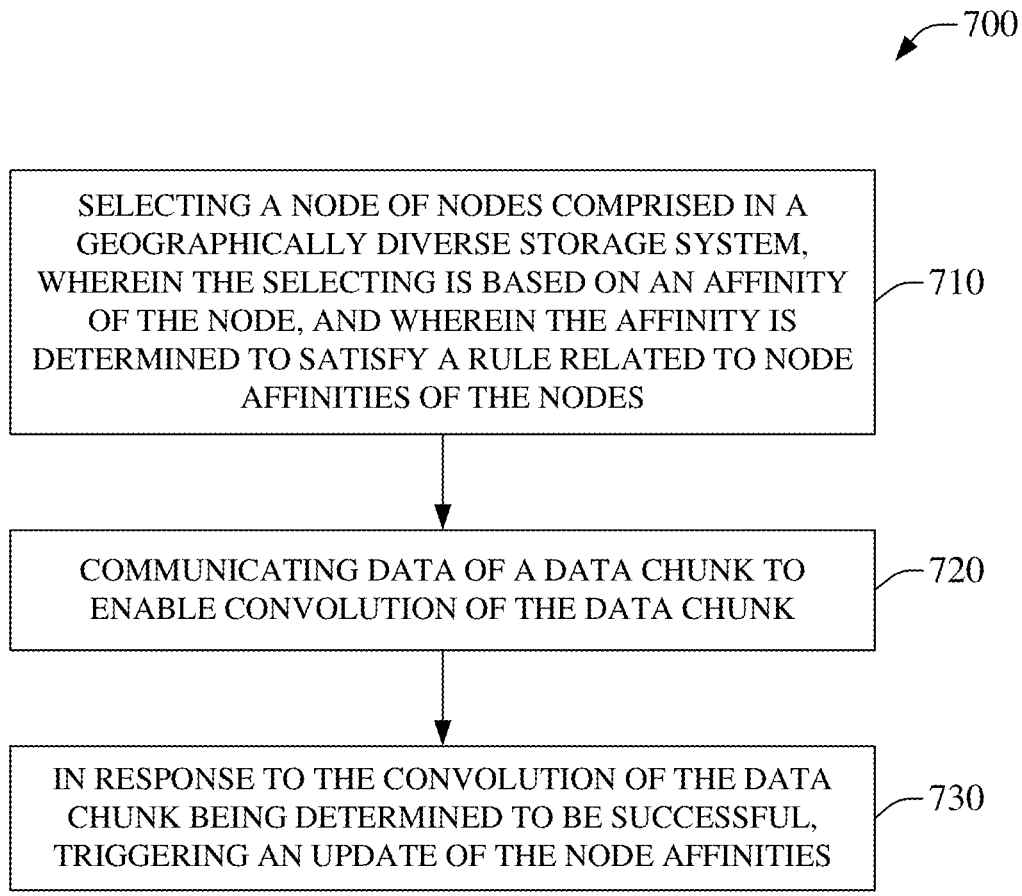
FIG. 7 is an illustration of an example method facilitating data convolution in a geographically diverse storage system based on updateable affinities of the nodes of the geographically diverse storage system, in accordance with aspects of the subject disclosure.
Figure 8:
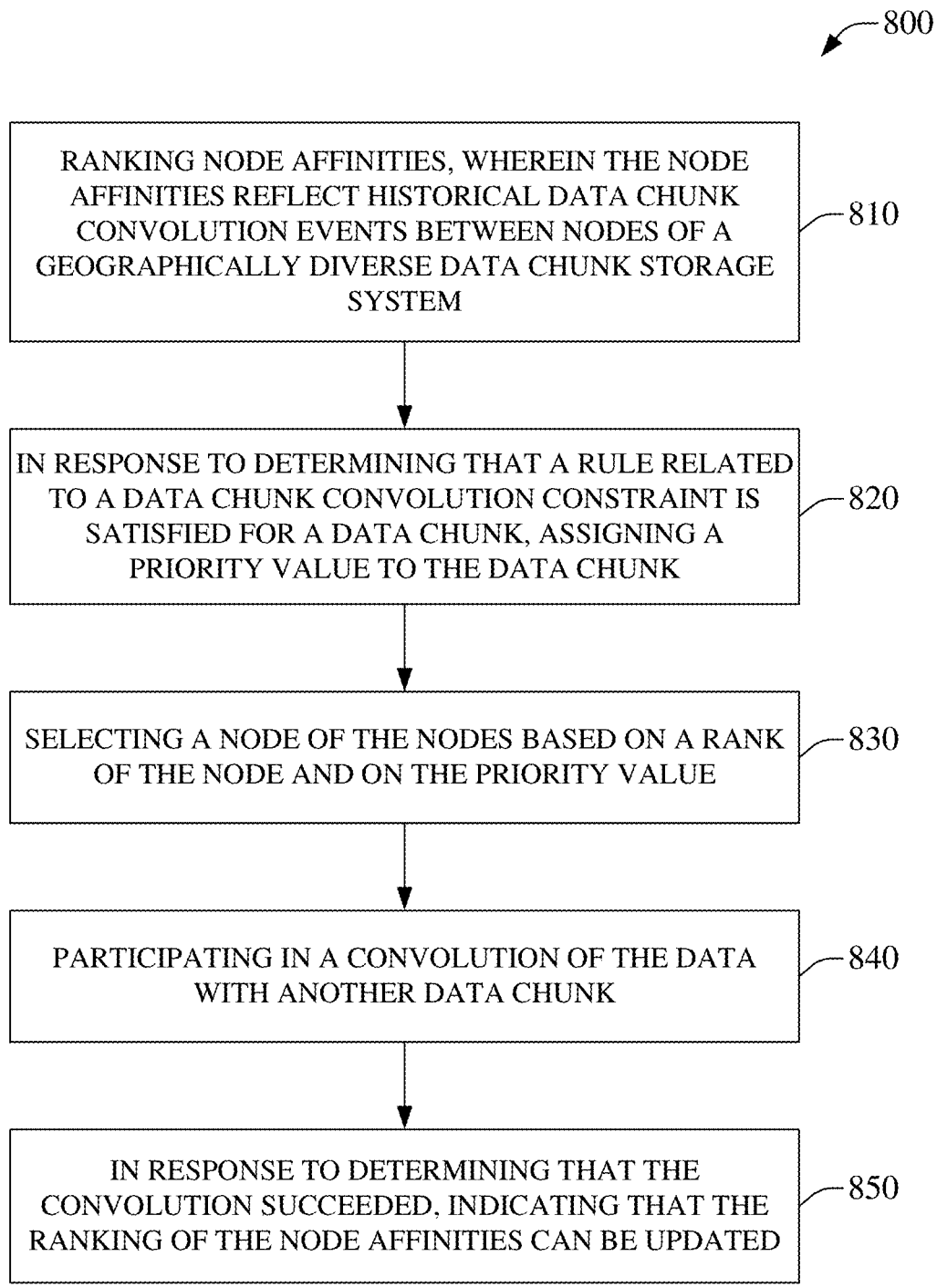
FIG. 8 illustrates an example method that enables data convolution in a geographically diverse storage system based on a priority of the data and updateable affinities of the nodes of the geographically diverse storage system, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Accordingly, a third zone can be directed to hold a copy of a first chunk from a first zone before generating a convolved chunk at the third zone until there is a second chunk from a second zone, wherein the third zone has an affinity for the first and second zones that is determine satisfy a rule related to a threshold affinity value, e.g., the affinity value for a convolved chunk for a pair of other zones is a lowest affinity value, is less than a threshold affinity value, etc. After the first and second chunks are convolved in the third zone the affinity value, affinity matrix, etc., can be updated, e.g., updating $X_{i,j}$ and $X_{j,i}$. Further, where a convolved chunk combines more than two data chunks, the convolved chunk can comprise another convolved chunk, which other convolved chunk can also have been generated based on affinities.

FIG. 6 is an illustration of an example method 600 that can facilitate affinity sensitive data convolution in a geographically diverse storage system, in accordance with aspects of the subject disclosure. Method 600, at 610, can comprise determining affinities with other nodes of a geographically diverse data storage system. An affinity can relate to where convolved chunks are stored, e.g., how often, with what frequency, how many overall convolved chunks, etc. As an example, frequently convolving chunks from a source zone at a target zone can be reflected in the target zone having a high affinity score, value, ranking, etc., to the source zone. As another example, a target zone can have a high count of total convolved chunks involving chunks from a source zone, again reflected in a high affinity for the target zone. Similarly, for example, affinity can be related to a high count of relevant convolved chunks in a target zone, e.g., as compared to total convolved chunks, a count of relevant chunks can be related to convolved chunks that are not stale, out of date, targeted for deletion/garbage collection, etc.

At 620, method 600 can comprise selecting a node of the other nodes based on an affinity of the affinities. In an example of a first technique, zone 350 of system 300 can have a high affinity in relation to zone 310, e.g., zone 350 can comprise many convolved chunks related to chunks of 310. Based on this high affinity, zone 310 can select, for example, zone 330. According to this example, because zone 350 already comprises many convolved chunks related to zone 310, in order to better distribute convolved chunks among nodes of the geographically diver data storage system 300, a next chunk from zone 310 can be directed to zone 330 where it can be convolved with another chunk, e.g., immediately if another chunk is already there or at a later time if another chunk is not yet ready to be convolved at zone 330.

In an example of a second technique, zone 350 of system 300 can have a high affinity in relation to chunks from zone 310 and zone 320, e.g., zone 350 can comprise many convolved chunks related to chunks of 310 and chunks of 320. Based on this high affinity, zone 350 can select another zone, for example, zone 330. According to this example, because zone 350 already comprises many convolved chunks related to zone 310 and zone 320, in order to better distribute convolved chunks among nodes of the geographically diver data storage system 300, zone 350 can be directed to combine a chunk from zone 310 with a chunk from zone 330, e.g., a chunk from a zone other than zone 320. In an aspect, this can occur immediately if the chunk from zone 330 is already at zone 350, or at a later time if a chunk from zone 330 is not yet available at zone 350.

At 630, method 600 can comprise, initiating convolution of a data chunk at the selected node, wherein the selected node results from the selecting at 620. At this point method 600 can end. In an embodiment, the convolution can be initiated by communication of the data chunk to/from the selected node, e.g., where it can be convolved immediately or after some delay as disclosed herein. In some embodiments, communicating the chunk can be delayed until another chunk is indicated as being ready to convolve at the selected node, wherein the communicating the chunk can cause the convolution with the other chunk to begin. In some embodiments, a chunk can be communicated to the selected zone and comprise an authorization request, wherein the selected zone can query a source zone for permission to proceed with a convolution when another chunk has become available at the selected zone. In some embodiments, a first chunk can be held until a second chunk from the selected zone is received, at which point the method can initiate convolution of the first and second chunk.

FIG. 7 is an illustration of an example method 700, facilitating data convolution in a geographically diverse storage system based on updateable affinities of the nodes of the geographically diverse storage system, in accordance with aspects of the subject disclosure. At 710, method 700 can comprise selecting a node of nodes comprised in a geographically diverse data storage system. The selecting can be based on an affinity of the node. An affinity can relate to where convolved chunks are stored, e.g., how often, with what frequency, how many overall convolved chunks, etc. The affinity can be determined to satisfy a rule related to node affinities of the nodes of the geographically diverse storage system. As examples, the affinity can be determined to be a lowest affinity, a highest affinity, an affinity less than an average affinity, an affinity above a threshold value, an affinity below a threshold value, etc.

At 720, method 700 illustrates communicating data of a data chunk to enable convolution of the data chunk. In a first technique, data can be communicated to the node to enable the data chunk to be convolved with another data chunk communicated to the node, e.g., steering a chunk to a selected target node. As an example, a chunk of a first zone and a chunk of a second zone can be represented in a convolved chunk in a convolving zone resulting in an affinity to the convolving zone. Accordingly, in this example, the first zone can steer other chunks to the zone selected at 710, e.g., a target zone, to better balance the affinities, for example, by enabling the first zone to be represented in convolved chunks at zones other than the convolving zone.

In a second technique, a data chunk can be received from the node which can enable the data chunk to be convolved by a convolving node when another data chunk from another node is received. In the second technique, the convolving node can wait for the data chunk from the node selected at 710, resulting in a convolved chunk that is in accord with the rule related to node affinities at 710. As an example, a chunk of a first zone and a chunk of a second zone can be represented in a convolved chunk in a convolving zone resulting in an affinity to the convolving zone and the selecting the node at 710 can result in selecting a third zone. Accordingly, in this example, the convolving zone can be instructed to convolve chunks from the first zone with chunks from the third zone to better balance the affinities, for example, by avoiding further combining chunks from the first zone with chunks from the second zone that would result in further concentrating the distribution of zones represented in convolved chunks.

At 730, method 700 can comprise triggering an update of the node affinities. At this point method 700 can end. In an aspect, the triggering the update can be in response to determining that the convolution of the data chunk at 720 was successful. In an aspect, where the convolution is successful, zones can be represented in convolved chunks in other zones in a manner that is different than before the successfully convolution. Accordingly, this can affect affinities between zones and an update of the affinities can be triggered.

FIG. 8 is an illustration of an example method 800, which can enable data convolution in a geographically diverse storage system based on a priority of the data and updateable affinities of the nodes of the geographically diverse storage system, in accordance with aspects of the subject disclosure. At 810, method 800 can comprise ranking node affinities. Node affinities can reflect historical data chunk convolution events between nodes of a geographically diverse data storage system.

At 820, method 800 can comprise assigning a priority value to a data chunk. The assignment of the priority value can be in response to determining that a rule related to a data chunk convolution constraint is satisfied. The constraint can be a selectable constraint. In an aspect, the constraint can indicate a constraint on zone selection, e.g., selecting a zone as a target zone for convolving a chunk, etc., that can affect or relate to an affinity score. As an example, a selectable constraint can indicate that a convolved chunk must be kept inside a selectable geo-political boundary, such as constraining convolved chunk generation to zones located in the United States, etc. As another example, a selectable constraint can indicate a preference to create a convolved chunk at a lower monetary cost, lower resource cost, etc. Accordingly, if a zone does not satisfy the constraint, the zone can be removed from consideration as a target zone, for example, even where the affinity of the zone is otherwise satisfactory. This can alter what zone, if any, is selected as a target zone, for example, based on location of zones, determined costs for convolving chunks in zones of the geographically diverse data storage system, etc. Additionally, a selectable constraint can indicate some zones as preferred zones, e.g., where a target zone is connected with a high speed, high capacity, low latency, etc., network connection, it can be a preferred zone in comparison to a zone having a slower, higher latency, etc., network connection. However, even where a zone is a preferred zone, the zone may still not be selected due to zone affinities.

At 830, method 800 can comprise selecting a node of the nodes based on a rank of the node and the priority value. As an example, a highest ranked node that also has a satisfactory priority value can be selected. As a further example, a lower ranked node can be selected based on the priority value. As a still further example, a higher ranked node can be rejected, which can result in selection of a lower ranked node, where the higher ranked node does not have a satisfactory priority value.

Method 800, at 840, can comprise participating in a convolution of the data chunk with another data chunk. In an aspect, communicating the data chunk to the node selected at 830 can be regarded as participating in the convolution. In a further aspect, convolving another data chunk after receiving the data chunk from the node selected at 830 can be regarded as participating in the convolution of the data chunk.

At 850, method 800 can comprise indicating that the ranking of the node affinities can be updated. At this point method 800 can end. The indicating that the ranking of the node affinities can be updated can be in response to determining that the convolution referenced at 840 has been completed. Whereas generating a convolved chunk can alter distribution of zones represented in convolved chunks, and accordingly alter affinities, the affinities can be updated after the convolution of the data chunk.

Figure 9:
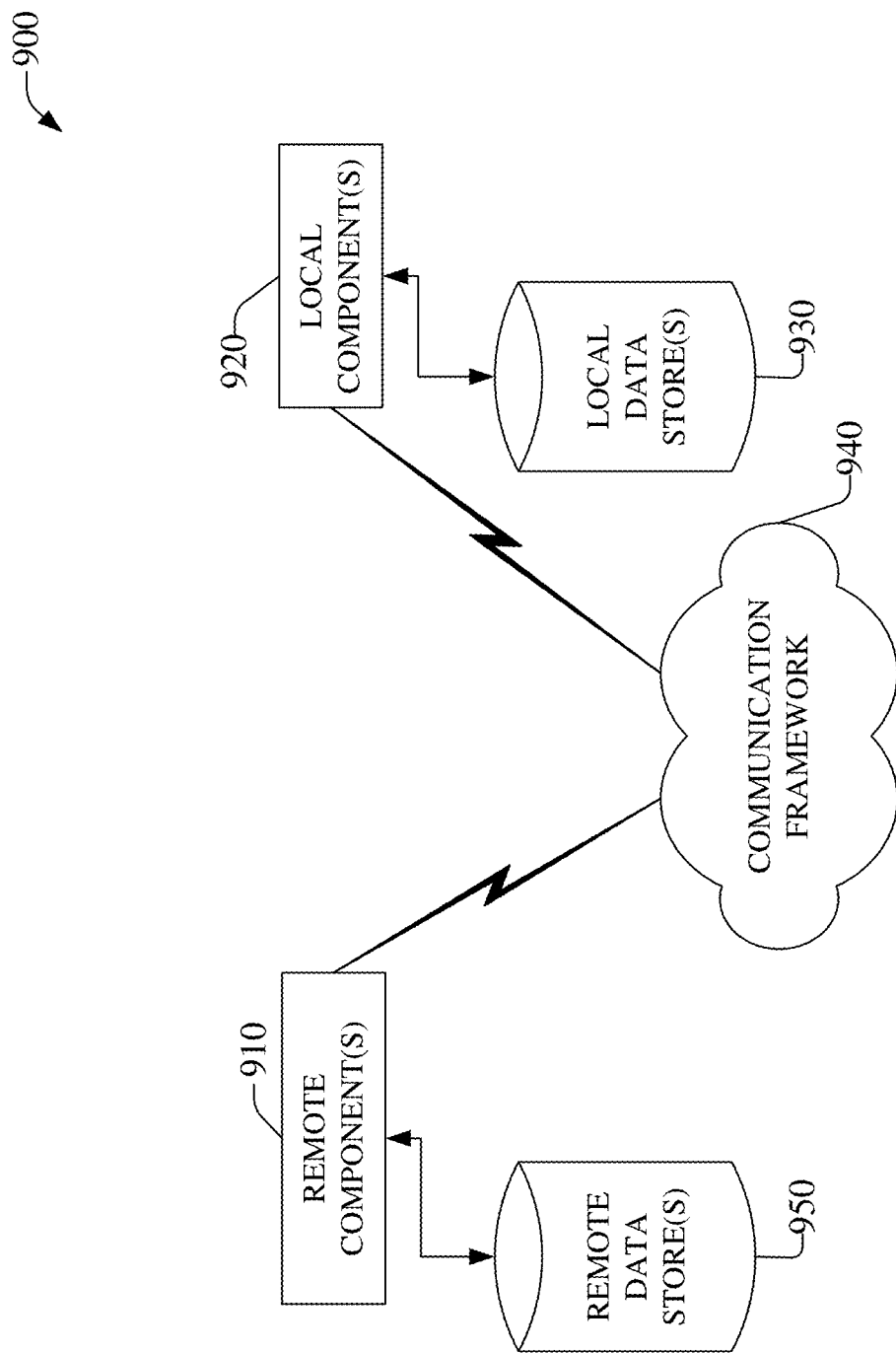
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework, e.g., communication framework 140, 240, 940, etc. Communication framework 940 can comprise wired network devices, wireless network devices, mobile devices, wearable devices, radio access network devices, gateway devices, femtocell devices, servers, etc. In an aspect the remotely located ZSC can be embodied in ZSC 110, 120, 130, 210, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the local ZSC can be embodied in ZSC 110, 120, 130, 210, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate determining affinities, comportment with constraints on convolution, communicating of supplemental information, e.g., SI 214, etc., as disclosed herein.

Figure 10:
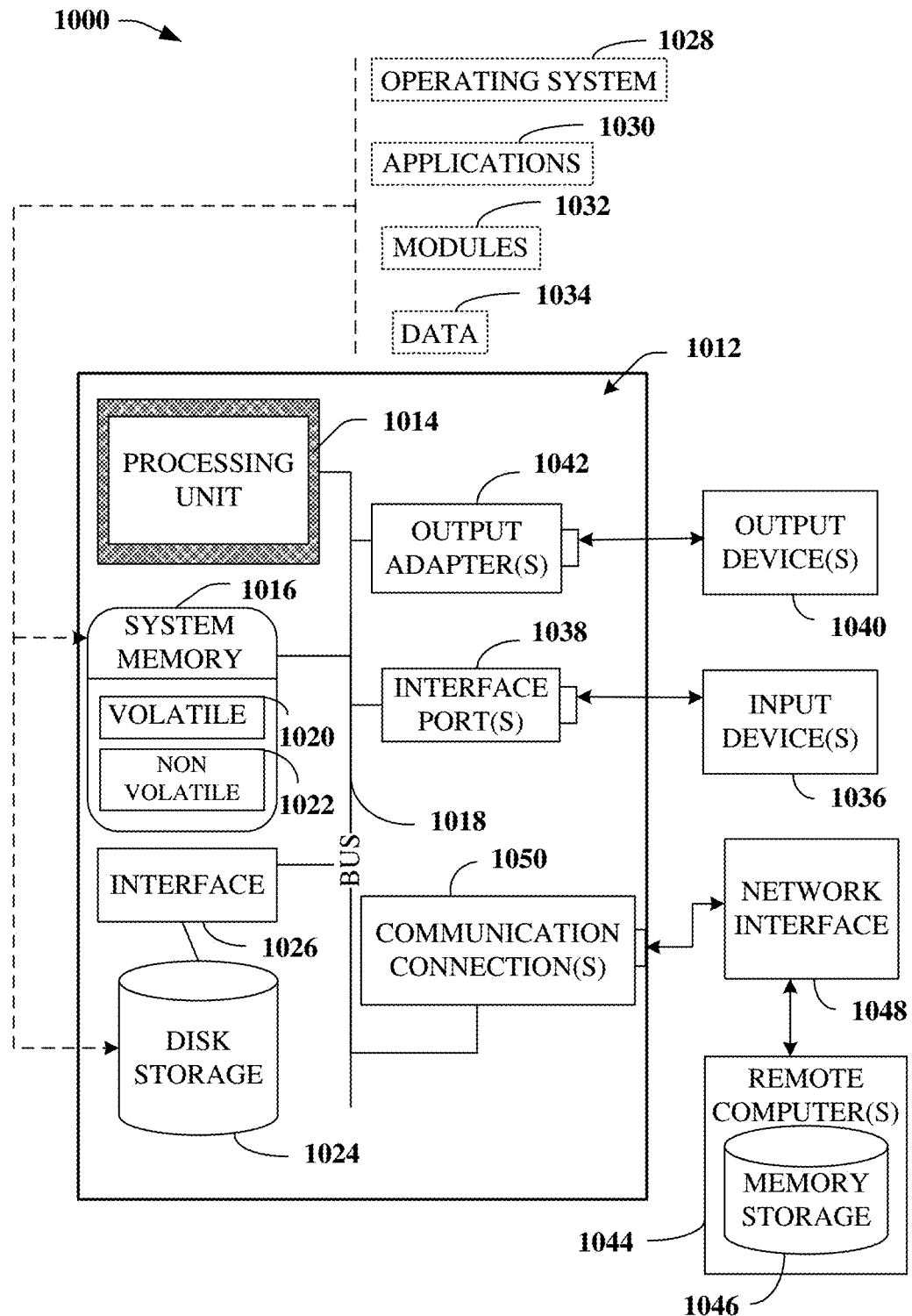
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 130, 210, etc., external ZSC controller component 211A, etc., remote supplemental information source(s) 242, etc., or in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining affinity values of geographically diverse data storage system nodes, causing convolution of a first chunk and a second chunk based on the affinity values, resulting in a convolved chunk, and, in response to the convolved chunk, updating the affinity values of the nodes, as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining, for a first node of a geographically diverse data storage system, affinity rankings of other nodes other than the first node of the geographically diverse data storage system;
   selecting a second node of the other nodes based on an affinity rank of the second node; and
   initiating convolution of a first data chunk of the first node and a second data chunk of a third node at the second node.

2. The system of claim 1, wherein the operations further comprise:
   in response to determining that a rule related to a data chunk convolution constraint is satisfied, assigning a priority value to the first data chunk; and
   wherein the selecting the second node is further based on the priority value.

3. The system of claim 2, wherein the data chunk convolution constraint indicates a geographical boundary.

4. The system of claim 2, wherein the data chunk convolution constraint indicates a political boundary.

5. The system of claim 1, wherein the first node is located in a first time zone, wherein the third node is located in a second time zone, and wherein the first time zone is a different time zone than the second time zone.

6. The system of claim 1, wherein the affinity rank is based on historical data chunk convolution events.

7. The system of claim 6, wherein the affinity rank is based on a count of the historical data chunk convolution events.

8. The system of claim 7, wherein the count is a count of currently relevant historical data chunk convolution events.

9. The system of claim 6, wherein the affinity rank is based on a frequency of the historical data chunk convolution events.

10. The system of claim 1, wherein the affinity rank is based on historical computer resource performance of computer resources of the geographically diverse data storage system.

11. The system of claim 1, wherein the operations further comprise:
    in response to determining that the initiating the convolution has resulted in generating a convolved chunk at the second node, updating the affinity rank of the second node.

12. A method, comprising:
    determining, by a system comprising a processor and a memory, affinity values of nodes of geographically diverse data storage system, wherein the nodes comprise a first node, second node, and third node;

enabling, by the system, convolution of a first chunk of the first node and a second chunk of the second node based on the affinity values other than a first node affinity value of the affinity values, wherein the first node affinity value corresponds to the first node, wherein the convolution results in a convolved chunk at the third node; and updating, by the system, the affinity values of the nodes of the geographically diverse data storage system.

13. The method of claim 12, wherein:

the enabling the convolution comprises:

selecting, by the system, the third node of the nodes based on a third node affinity value of the affinity values; and in response to receiving the first chunk and the second chunk at the third node, triggering, by the system, the convolution of the first chunk and the second chunk at the third node.

14. The method of claim 12, wherein:

the first chunk is received, from the first node, by a convolving node of the nodes, wherein the convolving node comprises the processor;

the second chunk is received, from the second node of the nodes, by the convolving node; and the enabling the convolution comprises:

selecting, by the system, the second node based on a second node affinity value of the affinity values; and triggering, by the system, the convolution of the first chunk and the second chunk at the convolving node, wherein the convolving node is the third node.

15. The method of claim 14, wherein the first chunk is received by the convolving node before the selecting the second node, resulting in the triggering the convolution being delayed, by the system, until after the selecting the second node and after the second chunk is received by the convolving node.

16. The method of claim 12, further comprising:

determining, by the system, a priority value of the first chunk based on determining that a chunk convolution constraint is satisfied; and wherein the enabling the convolution of the first and second chunk is further based on the priority value of the first chunk.

17. A system, comprising:

a processor; and a memory that stores executable instructions that, when executed by the processor, facilitate performance of operations, comprising:

determining, for a convoluting node of a geographically diverse data storage system, affinity rankings of source nodes other than a first source node of the geographically diverse data storage system;

determining that a first data chunk from the first source node of the source nodes is received by the convoluting node; and in response to selecting a second source node of the source nodes based on a corresponding affinity rank of the affinity rankings, initiating convolution of the first data chunk and a second data chunk at the convoluting node, wherein the second data chunk is received from the second source node.

18. The system of claim 17, wherein the operations further comprise:

in response to determining that the initiating the convolution has resulted in generating a convolved chunk at the convolving node, updating the affinity rankings of the source nodes.

19. The system of claim 17, wherein the initiating the convolution occurs contemporaneous to the convolving node receiving the first data chunk from the first source node.

20. The system of claim 17, wherein the convolving node receives the first data chunk from the first source node prior to the convolving node receiving the second data chunk from the second source node, resulting in the initiating convolution being delayed.

\* \* \* \* \*